(12) United States Patent
Lin et al.

(10) Patent No.: US 8,629,854 B2
(45) Date of Patent: Jan. 14, 2014

(54) CONTROLLING METHOD APPLIED TO A SENSING SYSTEM

(75) Inventors: Cho-Yi Lin, Hsinchu (TW); Chih-Hung Lu, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 1049 days.

(21) Appl. No.: 12/557,466

(22) Filed: Sep. 10, 2009

(65) Prior Publication Data

US 2010/0289773 A1 Nov. 18, 2010

(30) Foreign Application Priority Data

May 18, 2009 (TW) .............................. 98116457 A

(51) Int. Cl.
*G06F 3/042* (2006.01)
(52) U.S. Cl.
USPC ........................................ 345/175; 178/18.09
(58) Field of Classification Search
None
See application file for complete search history.

(56) References Cited

U.S. PATENT DOCUMENTS

| | | | |
|---|---|---|---|
| 4,782,328 A | 11/1988 | Denlinger | |
| 6,208,330 B1 * | 3/2001 | Hasegawa et al. | 345/173 |
| 6,239,789 B1 | 5/2001 | Sekizawa et al. | |
| 6,674,424 B1 * | 1/2004 | Fujioka | 345/157 |
| 6,680,732 B2 * | 1/2004 | Yoo | 345/173 |
| 6,803,906 B1 | 10/2004 | Morrison et al. | |
| 6,954,197 B2 | 10/2005 | Morrison et al. | |
| 2002/0075244 A1 * | 6/2002 | Tani et al. | 345/173 |
| 2005/0243070 A1 * | 11/2005 | Ung et al. | 345/176 |
| 2006/0132457 A1 * | 6/2006 | Rimas-Ribikauskas et al. | 345/173 |
| 2008/0186289 A1 | 8/2008 | Ijima et al. | |
| 2008/0259053 A1 | 10/2008 | Newton | |
| 2008/0316183 A1 * | 12/2008 | Westerman et al. | 345/173 |
| 2009/0195372 A1 | 8/2009 | Aichi et al. | |
| 2012/0274591 A1 | 11/2012 | Rimas-Ribikauskas et al. | |

FOREIGN PATENT DOCUMENTS

| | | |
|---|---|---|
| TW | 200816062 | 4/2008 |
| TW | 200839364 | 10/2008 |

* cited by examiner

*Primary Examiner* — Nicholas Lee
(74) *Attorney, Agent, or Firm* — WPAT, PC; Justin King

(57) ABSTRACT

A controlling method applied to a sensing system includes the following step. Whether a specific function is started is determined according to the size of a total pattern acquired. In an embodiment of the present invention, the step of determining whether the specific function is started according to the size of the total pattern acquired is the step of determining whether the specific function is started according to the size of the total pattern acquired and the length of time to successively acquire the total pattern. Accordingly, it is more convenient for a user to use the sensing system having the said controlling method.

18 Claims, 12 Drawing Sheets

CONTROLLING METHOD APPLIED TO A SENSING SYSTEM

CROSS-REFERENCES

This application claims priority to a Taiwan application No. 098116457 filed on May 18, 2009. U.S. application Ser. No. 12/422,191 filed on Apr. 10, 2009 which claims priority to Taiwan application No. 098100969, U.S. application Ser. No. 12/334,449 filed on Dec. 13, 2008 which claims priority to Taiwan application No. 097126033, and U.S. application Ser. No. 12/249,222 filed on Oct. 10, 2008 which claims priority to Taiwan application No. 097126033 are co-pending with this application.

BACKGROUND

1. Field of the Invention

The present invention relates to a controlling method and in particular, to a controlling method applied to a sensing system.

2. Description of the Prior Art

A conventional sensing system includes a panel, two image sensors, and a processor. Each of the image sensors senses an area of the panel for acquiring an image, and the processer successively processes for calculating a position of a pointer on the area. The abovementioned technology has been disclosed in many related patents, such as U.S. Pat. No. 4,782,328, U.S. Pat. No. 6,803,906, and U.S. Pat. No. 6,954,197.

However, the functions of the abovementioned sensing systems still can not satisfy requirements of designers and therefore, the conventional sensing systems need to be improved.

BRIEF SUMMARY

The present invention is directed to provide a controlling method applied to a sensing system in which whether a specific function is started is determined according to the size of a total pattern acquired.

The present invention provides a controlling method applied to a sensing system including the following step. Whether a specific function is started is determined according to the size of a first total pattern acquired.

In an embodiment of the present invention, the step of determining whether the specific function is started according to the size of the first total pattern acquired is the step of determining whether the specific function is started according to the size of the first total pattern acquired and the length of time to successively acquire the first total pattern.

In an embodiment of the present invention, the sensing system includes a panel, a first image sensor, and a second image sensor. The first image sensor and the second image sensor are disposed at the panel. A sensing range of the first image sensor and a sensing range of the second image sensor cover an area of the panel, respectively. The step of determining whether the specific function is started according to the size of the first total pattern acquired and the length of time to successively acquire the first total pattern includes the following procedures. First, a procedure (a) is executed. The procedure (a) includes that the first image sensor and the second image sensor simultaneously sense the area for respectively acquiring a first image and a second image. The first image includes a first sub-pattern, and the second image includes a second sub-pattern. The first total pattern is composed of the first sub-pattern and the second sub-pattern. Next, a procedure (b) is executed. The procedure (b) includes that whether the size of the first total pattern is greater than or equal to a first predetermined value is determined. Next, a procedure (c) is executed. The procedure (c) includes that if the size of the first total pattern is greater than or equal to the first predetermined value, whether the length of time to successively acquire the first total pattern is greater than or equal to a second predetermined value is further determined. Next, a procedure (d) is executed. The procedure (d) includes that if the length of time to successively acquire the first total pattern is greater than or equal to the second predetermined value, the specific function is started.

In an embodiment of the present invention, the controlling method applied to a sensing system further includes the following procedure. A procedure (c1) is executed. The procedure (c1) includes that if the size of the first total pattern is smaller than the first predetermined value, a first coordinate of a first object which corresponds at that time to the first sub-pattern and the second sub-pattern is calculated and output and that the procedure (a) is then executed.

In an embodiment of the present invention, the procedure (d) further includes that a first coordinate of a first object which corresponds at that time to the first sub-pattern and the second sub-pattern is calculated and output.

In an embodiment of the present invention, the controlling method applied to a sensing system further includes the following procedure. A procedure (d1) is executed. The procedure (d1) includes that if the length of time to successively acquire the first total pattern is smaller than the second predetermined value, a first coordinate of a first object which corresponds at that time to the first sub-pattern and the second sub-pattern is calculated and output and that the procedure (a) is then executed.

In an embodiment of the present invention, after the procedure (d) is executed, the controlling method applied to a sensing system further includes the following procedures. A procedure (e) is executed. The procedure (e) includes that the first image sensor and the second image sensor simultaneously sense the area for respectively acquiring a third image and a fourth image. The third image includes a third sub-pattern, and the fourth image includes a fourth sub-pattern. A second total pattern is composed of the third sub-pattern and the fourth sub-pattern. Next, a procedure (f) is executed. The procedure (f) includes that whether the size of the second total pattern is smaller than the first predetermined value is determined. Next, a procedure (g) is executed. The procedure (g) includes that if the size of the second total pattern is smaller than the first predetermined value, whether the length of time to successively acquire the second total pattern is greater than or equal to the second predetermined value is further determined. Next, a procedure (h) is executed. The procedure (h) includes that if the length of time to successively acquire the second total pattern is greater than or equal to the second predetermined value, the specific function is ended.

In an embodiment of the present invention, the controlling method applied to a sensing system further includes the following procedure. A procedure (g1) is executed. The procedure (g1) includes that if the size of the second total pattern is greater than or equal to the first predetermined value, the specific function is successively started and that the procedure (e) is then executed. In addition, the procedure (g1) further includes that a second coordinate of a second object which corresponds at that time to the third sub-pattern and the fourth sub-pattern is calculated and output.

In an embodiment of the present invention, the procedure (h) further includes that a second coordinate of a second object which corresponds at that time to the third sub-pattern and the fourth sub-pattern is calculated and output.

In an embodiment of the present invention, the controlling method applied to a sensing system further includes the following procedure. A procedure (h1) is executed. The procedure (h1) includes that if the length of time to successively acquire the second total pattern is smaller than the second predetermined value, the specific function is successively started and that the procedure (e) is then executed. In addition, the procedure (h1) further includes that a second coordinate of a second object which corresponds at that time to the third sub-pattern and the fourth sub-pattern is calculated and output.

In an embodiment of the present invention, the first image sensor has a plurality of first sensing pixels suitable for sensing the area, and the second image sensor has a plurality of second sensing pixels suitable for sensing the area. The size of the second total pattern is the sum total of the amount of the corresponding first sensing pixels which acquire the third sub-pattern and the amount of the corresponding second sensing pixels which acquire the fourth sub-pattern.

In an embodiment of the present invention, the first image sensor has a plurality of first sensing pixels suitable for sensing the area, and the second image sensor has a plurality of second sensing pixels suitable for sensing the area. The size of the first total pattern is the sum total of the amount of the corresponding first sensing pixels which acquire the first sub-pattern and the amount of the corresponding second sensing pixels which acquire the second sub-pattern.

In an embodiment of the present invention, the sensing system includes a panel, an image sensor, and a reflective mirror element. The image sensor is disposed at the panel. The reflective mirror element is disposed at the panel and mirrors a first area of the panel for forming a second area. A sensing range of the image sensor covers the first area and the second area. The step of determining whether the specific function is started according to the size of the first total pattern acquired and the length of time to successively acquire the first total pattern includes the following procedures. First, a procedure (a) is executed. The procedure (a) includes that the image sensor senses the first area and the second area for acquiring a first image. The first image includes a first sub-pattern and a second sub-pattern, and the first total pattern is composed of the first sub-pattern and the second sub-pattern. Next, a procedure (b) is executed. The procedure (b) includes that whether the size of the first total pattern is greater than or equal to a first predetermined value is determined. Next, a procedure (c) is executed. The procedure (c) includes that if the size of the first total pattern is greater than or equal to the first predetermined value, whether the length of time to successively acquire the first total pattern is greater than or equal to a second predetermined value is further determined. Next, a procedure (d) is executed. The procedure (d) includes that if the length of time to successively acquire the first total pattern is greater than or equal to the second predetermined value, the specific function is started.

In an embodiment of the present invention, the controlling method applied to a sensing system further includes the following procedure. A procedure (c1) is executed. The procedure (c1) includes that if the size of the first total pattern is smaller than the first predetermined value, a first coordinate of a first object which corresponds at that time to the first sub-pattern and the second sub-pattern is calculated and output and that the procedure (a) is then executed.

In an embodiment of the present invention, the procedure (d) further includes that a first coordinate of a first object which corresponds at that time to the first sub-pattern and the second sub-pattern is calculated and output.

In an embodiment of the present invention, the controlling method applied to a sensing system further includes the following procedure. A procedure (d1) is executed. The procedure (a) includes that if the length of time to successively acquire the first total pattern is smaller than the second predetermined value, a first coordinate of a first object which corresponds at that time to the first sub-pattern and the second sub-pattern is calculated and output and that the procedure (a) is then executed.

In an embodiment of the present invention, after the procedure (d) is executed, the controlling method applied to a sensing system further includes the following procedures. A procedure (e) is executed. The procedure (e) includes that the image sensor senses the first area and the second area for acquiring a second image. The second image includes a third sub-pattern and a fourth sub-pattern, and a second total pattern is composed of the third sub-pattern and the fourth sub-pattern. Next, a procedure (f) is executed. The procedure (f) includes that whether the size of the second total pattern is smaller than the first predetermined value is determined. Next, a procedure (g) is executed. The procedure (g) includes that if the size of the second total pattern is smaller than the first predetermined value, whether the length of time to successively acquire the second total pattern is greater than or equal to the second predetermined value is further determined. Next, a procedure (h) is executed. The procedure (h) includes that if the length of time to successively acquire the second total pattern is greater than or equal to the second predetermined value, the specific function is ended.

In an embodiment of the present invention, the controlling method applied to a sensing system further includes the following procedure. A procedure (g1) is executed. The procedure (g1) includes that if the size of the second total pattern is greater than or equal to the first predetermined value, the specific function is successively started and that the procedure (e) is then executed. In addition, the procedure (g1) further includes that a second coordinate of a second object which corresponds at that time to the third sub-pattern and the fourth sub-pattern is calculated and output.

In an embodiment of the present invention, the procedure (h) further includes that a second coordinate of a second object which corresponds at that time to the third sub-pattern and the fourth sub-pattern is calculated and output.

In an embodiment of the present invention, the controlling method applied to a sensing system further includes the following procedure. A procedure (h1) is executed. The procedure (h1) includes that if the length of time to successively acquire the second total pattern is smaller than the second predetermined value, the specific function is successively started and that the procedure (e) is then executed. In addition, the procedure (h1) further includes that a second coordinate of a second object which corresponds at that time to the third sub-pattern and the fourth sub-pattern is calculated and output.

In an embodiment of the present invention, the image sensor has a plurality of sensing pixels suitable for sensing the first area and the second area. The size of the second total pattern is the sum total of the amount of the corresponding sensing pixels which acquire the third sub-pattern and the amount of the corresponding sensing pixels which acquire the fourth sub-pattern.

In an embodiment of the present invention, the image sensor has a plurality of sensing pixels suitable for sensing the first area and the second area. The size of the first total pattern is the sum total of the amount of the corresponding sensing pixels which acquire the first sub-pattern and the amount of the corresponding sensing pixels which acquire the second sub-pattern.

In an embodiment of the present invention, the specific function is an erasing function.

In the controlling method applied to the sensing system, whether the specific function is started is determined according to the size of the first total pattern acquired. Accordingly, it is more convenient for a user to use the sensing system having the abovementioned controlling method. In addition, in the controlling method applied to the sensing system, the abovementioned step is the step of determining whether the specific function is started according to the size of the first total pattern acquired and the length of time to successively acquire the first total pattern. Therefore, the possibility that the sensing system starts the specific function because of misjudgment can be reduced.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

First Embodiment

Figure 1:
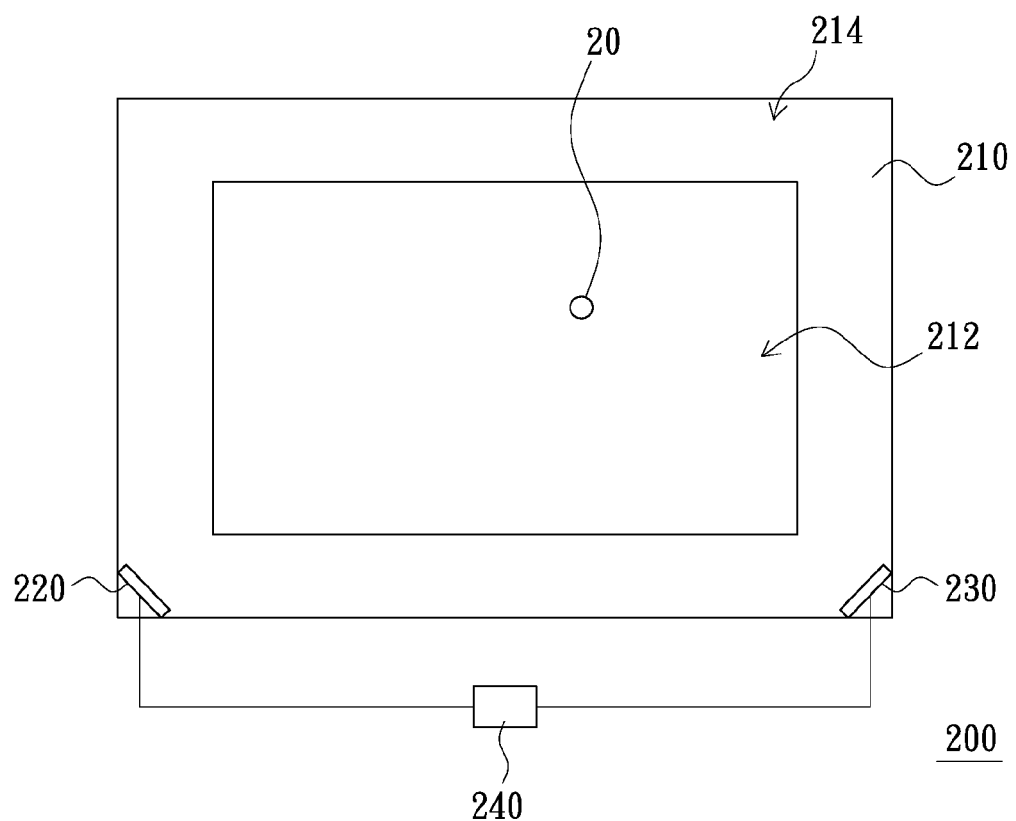
FIG. 1 is a schematic view of a sensing system according to a first embodiment of the present invention.

FIG. 1 is a schematic view of a sensing system according to a first embodiment of the present invention. Referring to FIG. 1, the sensing system 200 of the embodiment includes a panel 210, a first image sensor 220, a second image sensor 230 and a processor 240. The panel 210 has a surface 214 and an area 212, and the area 212 is located at the surface 214. The area 212 is a quadrilateral for example. The first image sensor 220 and the second image sensor 230 are disposed at the surface 214 of the panel 210 and are electrically connected to the processor 240. A sensing range of the first image sensor 220 and a sensing range of the second image sensor 230 cover the area 212, respectively. In this embodiment, the panel 210 is a whiteboard or a touch screen for example.

When a user uses an object 20 which is capable of being sensed by the sensing system 200 such that the object 20 approaches the area 212, the first image sensor 220 and the second image sensor 230 sense the area 212 respectively and the processor 240 calculates a position of the object 20 according to images sensed by the first image sensor 220 and the second image sensor 230. The abovementioned technologies can be referred to U.S. Pat. No. 4,782,328 and U.S. Pat. No. 6,803,906 and should not be described in detail herein. In addition, when the object 20 moves on the area 212, the movement path will be displayed on the panel 210 such as a touch screen or a display device (not shown) electrically connected to the panel 210.

Figure 2A:
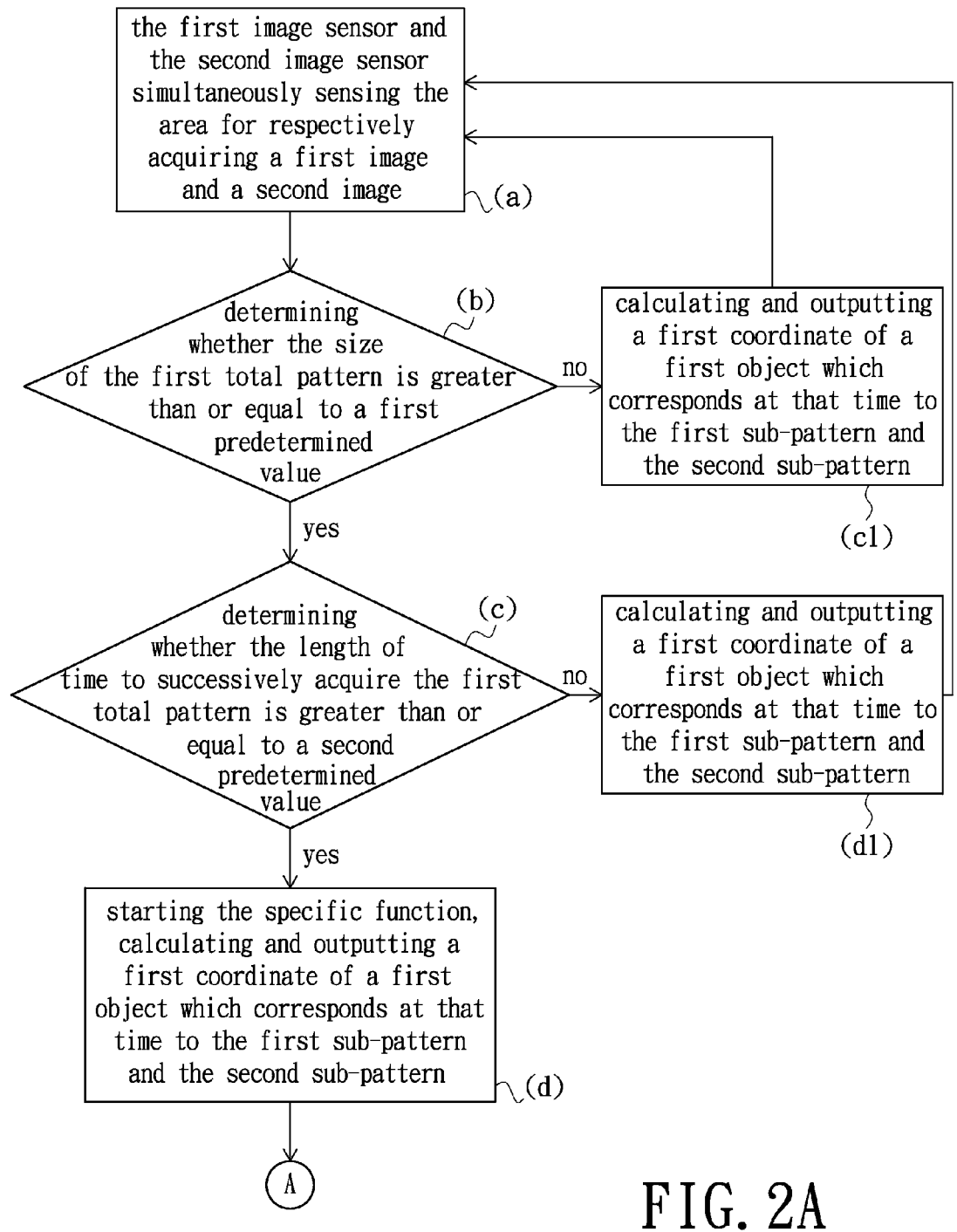
FIG. 2A to FIG. 2B are a flow chart of a controlling method applied to the sensing system of FIG. 1 according to the first embodiment of the present invention.
Figure 2B:
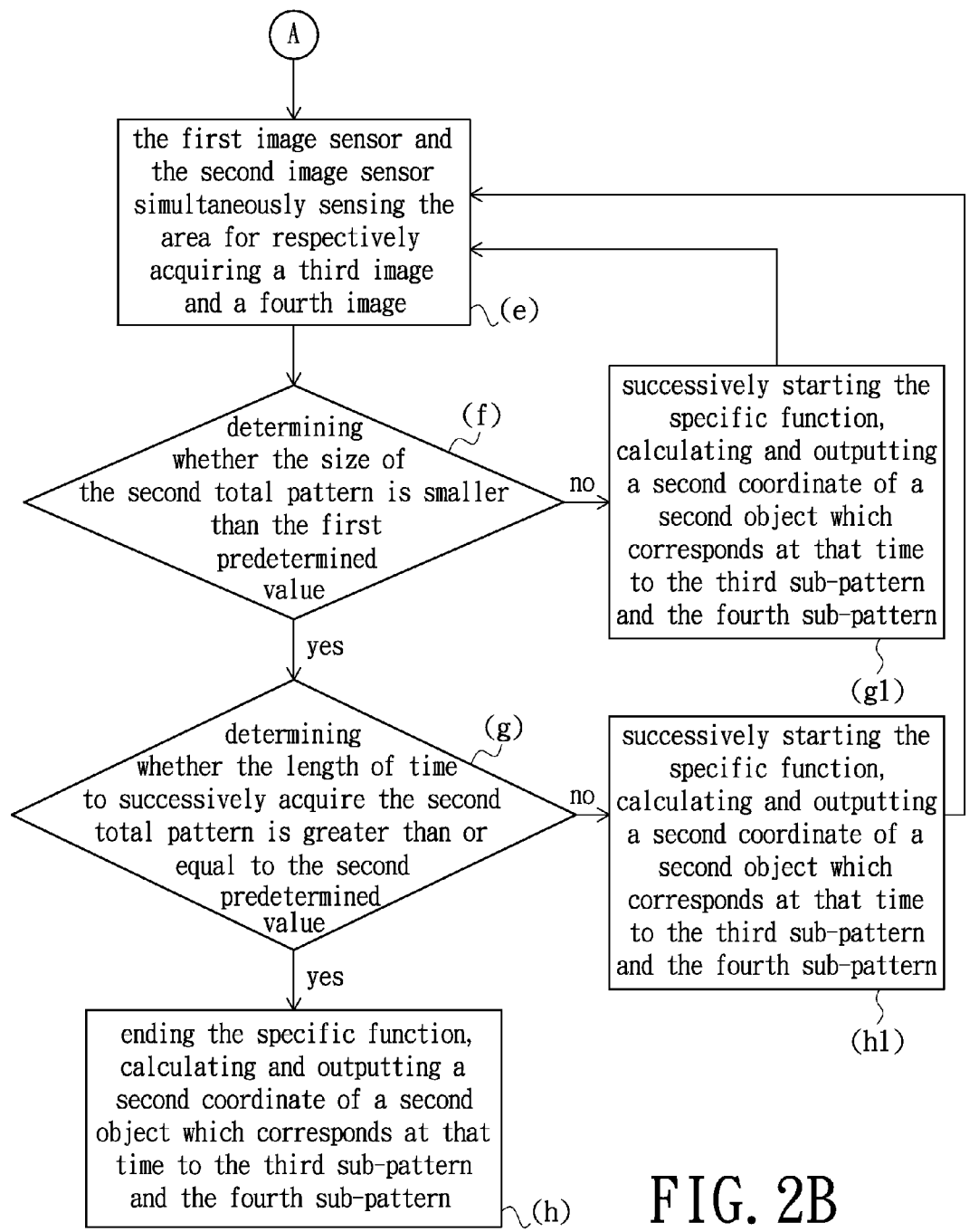
Figure 3A:
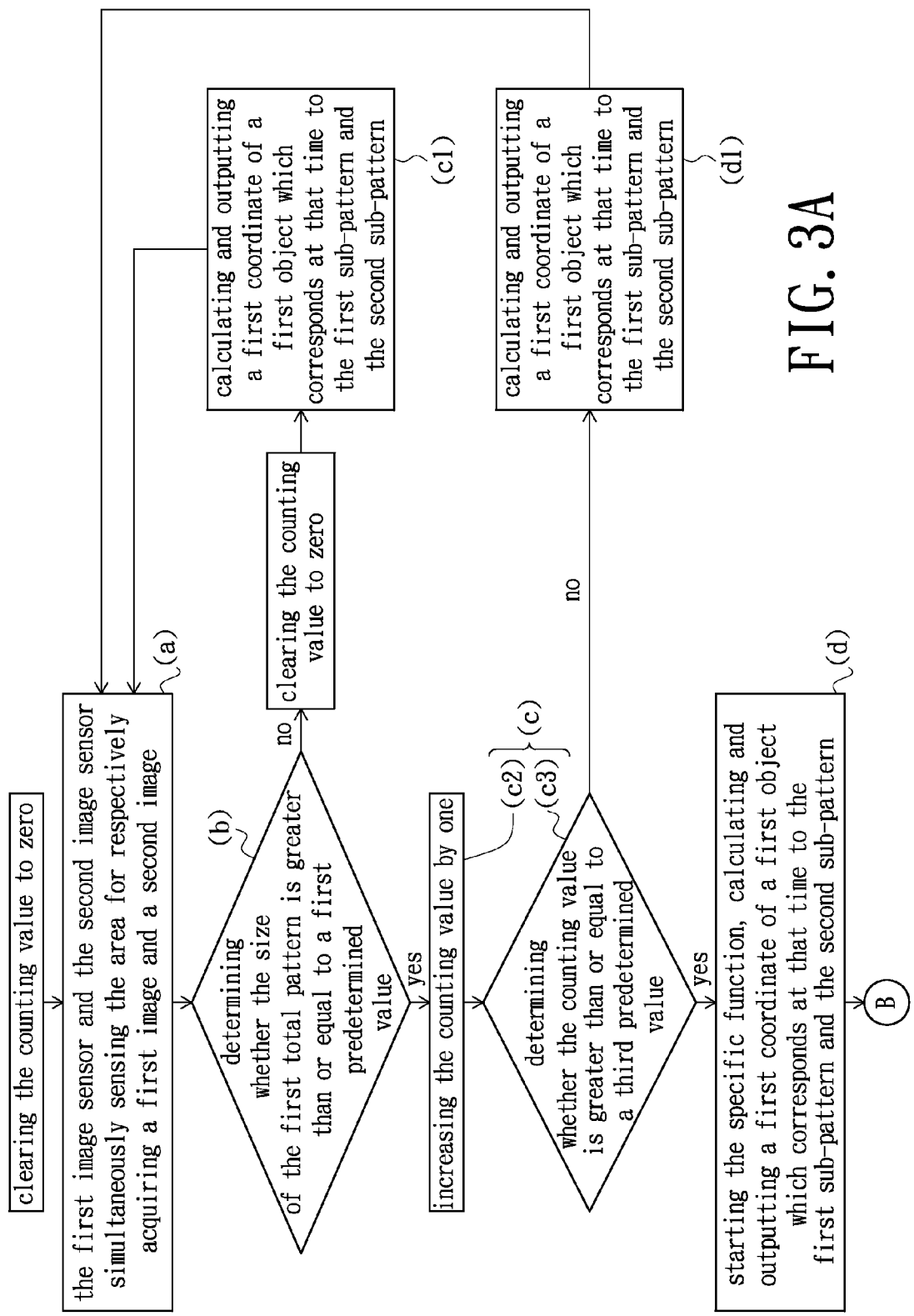
FIG. 3A to FIG. 3B are a detailed flow chart of the controlling method of FIGS. 2A and 2B.
Figure 3B:
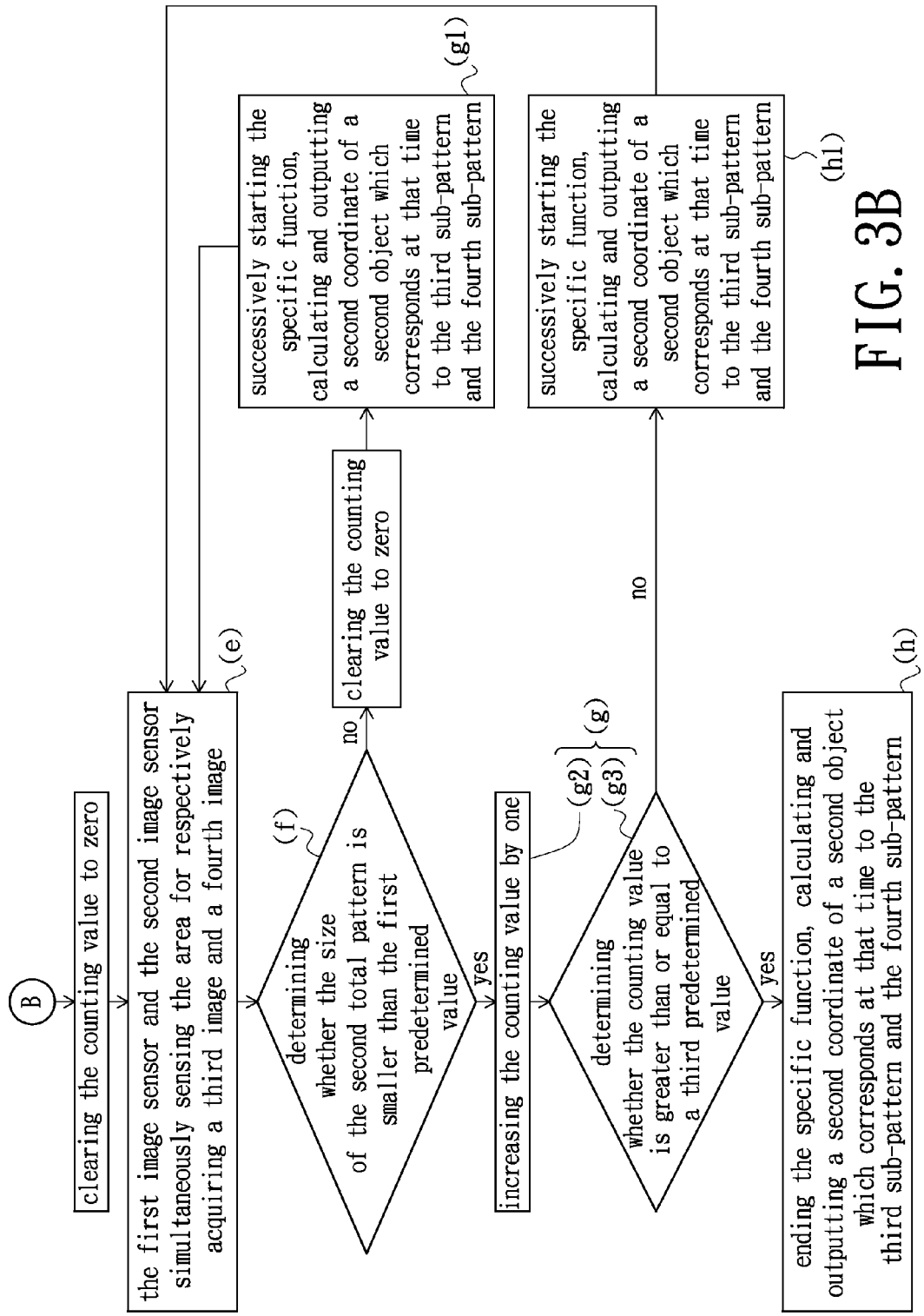
Figure 4:
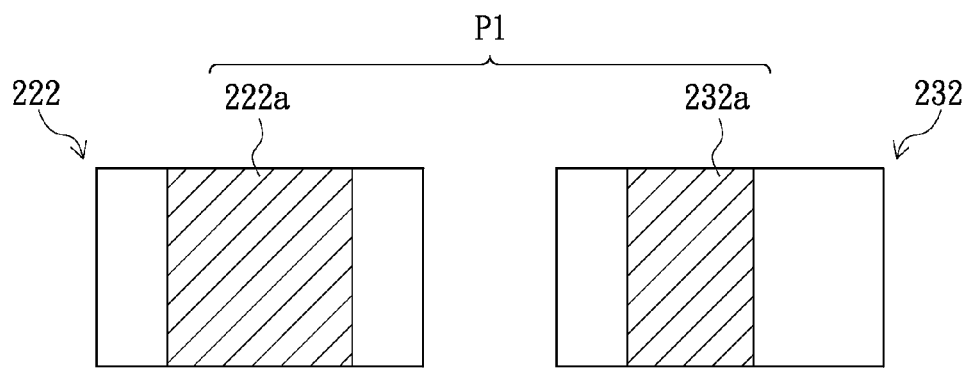
FIG. 4 is a schematic view of a first image and a second image respectively sensed by the first image sensor and the second image sensor of the sensing system of FIG. 1.

FIG. 2A to FIG. 2B are a flow chart of a controlling method applied to the sensing system of FIG. 1 according to the first embodiment of the present invention. FIG. 3A to FIG. 3B are a detailed flow chart of the controlling method of FIGS. 2A and 2B. FIG. 4 is a schematic view of a first image and a second image respectively sensed by the first image sensor and the second image sensor of the sensing system of FIG. 1. Referring to FIGS. 1, 2, 3 and 4, generally speaking, the controlling method applied to the sensing system includes the step of determining whether a specific function is started according to the size of a first total pattern P1 acquired. In this embodiment, the abovementioned step is the step of determining whether the specific function is started according to the size of the first total pattern P1 acquired and the length of time to successively acquire the first total pattern P1. The description will be given in detail below.

First, a procedure (a) is executed. The procedure (a) includes that the first image sensor 220 and the second image sensor 230 simultaneously sense the area 212 for respectively acquiring the first image 222 and the second image 232. The first image 222 includes a first sub-pattern 222a and the second image 232 includes a second sub-pattern 232a. The first total pattern P1 is composed of the first sub-pattern 222a and the second sub-pattern 232a.

In this embodiment, the first image sensor 220 has a plurality of first sensing pixels (not shown) suitable for sensing the area 212, and the second image sensor 230 has a plurality of second sensing pixels (not shown) suitable for sensing the area 212. When a first object (not shown) approaches the area 212 of the panel 210, the first sensing pixels of the first image sensor 220 and the second sensing pixels of the second image sensor 230 simultaneously sense the area 212, and the first sensing pixels of the first image sensor 220 acquire the first image 222 and the second sensing pixels of the second image sensor 230 acquire the second image 232. Meanwhile, at least a part of the first sensing pixels sense the first object to acquire the first sub-pattern 222a and at least a part of the second sensing pixels sense the first object to acquire the second sub-pattern 232a. That is, at this moment, the first object is adjacent to the area 212 of the panel 210 and sensed by the first image sensor 220 and the second image sensor 230 to be acquired as the first sub-pattern 222a of the first image 222 and the second sub-pattern 232a of the second image 232.

The first object may be a stylus, a finger, a board eraser or a palm. If the first object is a stylus or a finger, the size of the first total pattern P1 is relatively small. The size of the first total pattern P1 is, for example, the sum total of the amount of the corresponding first sensing pixels which acquire the first sub-pattern 222a and the amount of the corresponding second sensing pixels which acquire the second sub-pattern 232a. In addition, if the first object is a board eraser or a palm, the size of the first total pattern P1 is relatively large. It should be noted that the first object corresponding to the first sub-pattern 222a and the second sub-pattern 232a of FIG. 4 is, for example, a board eraser.

It should be noted that when a plurality of first objects approach the area 212 of the panel 210, for example, when two fingers touch the area 212 of the panel 210, the first image 222 may include a plurality of first sub-patterns 222a and the second image 232 may include a plurality of second sub-patterns 232a. Meanwhile, the first total pattern P1 is composed of the first sub-patterns 222a and the second sub-patterns 232a, and the size of the first total pattern P1 is the sum total of the amount of the corresponding first sensing pixels which acquire the first sub-patterns 222a and the amount of the corresponding second sensing pixels which acquire the second sub-patterns 232a.

Next, a procedure (b) is executed. The procedure (b) includes that the processor 240 determines whether the size of the first total pattern P1 is greater than or equal to a first predetermined value. In this embodiment, the first predetermined value may be a predetermined amount of pixels which may be between ½ of the sum total of the amount of the first sensing pixels of the first image sensor 220 and the amount of the second sensing pixels of the second image sensor 230 and ⅔ of the sum total of the amount of the first sensing pixels of the first image sensor 220 and the amount of the second sensing pixels of the second image sensor 230.

Next, a procedure (c) is executed. The procedure (c) includes that if the size of the first total pattern P1 is greater than or equal to the first predetermined value, whether the length of time to successively acquire the first total pattern P1 is greater than or equal to a second predetermined value (e.g. 1.5 seconds) is further determined. It should be noted that the procedure (c) of FIG. 2A may be accomplished by means of the counting manner of FIG. 3A. For example, the first image sensor 220 and the second image senor 230 are designed to sense the area 212 once every time interval (e.g. 1/240 seconds). Whenever the first image sensor 220 and the second image sensor 230 sense the area 212, the processor 240 determines whether the size of the first total pattern P1 is greater than or equal to the first predetermined value. If the determination result is positive, the counting value is increased by one and the processor 240 further determines whether the counting value is greater than or equal to a third predetermined value, as shown in sub-procedures (c2) and (c3) of FIG. 3. In this embodiment, the second predetermined value (e.g. 1.5 seconds) is converted to the third predetermined value (e.g. 360 times) by means of the calculation (e.g. 1.5 divided by 1/240).

Next, a procedure (d) is executed. The procedure (d) includes that if the length of time to successively acquire the first total pattern P1 is greater than or equal to the second predetermined value, that is, if the counting value is greater than or equal to the third predetermined value, the processor 240 starts the specific function, calculates and outputs a first coordinate of the first object which corresponds at that time to the first sub-pattern 222a and the second sub-pattern 232a. In this embodiment, at this moment, the first object such as a board eraser or a palm is regarded by the sensing system 200 as an erasing instrument, and the specific function may erase the movement path displayed by the panel 210 such as a touch screen or by the additional display device. That is, the specific function may be an erasing function.

In addition, after the procedure (b) is executed, the controlling method applied to the sensing system further includes executing procedure (c1). The procedure (c1) includes that if the size of the first total pattern P1 is smaller than the first predetermined value, the processor 240 calculates and outputs the first coordinate of the first object which corresponds at that time to the first sub-pattern 222a and the second sub-pattern 232a and that the controlling process returns to the procedure (a). In this embodiment, at this moment, the first object such as a stylus or a finger is regarded by the sensing system 200 as a pointer.

In addition, after the procedure (c) is executed, the controlling method applied to the sensing system further includes executing procedure (d1). The procedure (d1) includes that if the length of time to successively acquire the first total pattern P1 is smaller than the second predetermined value, that is, if the counting value is smaller the third predetermined value, the processor 240 calculates and outputs the first coordinate of the first object which corresponds at that time to the first sub-pattern 222a and the second sub-pattern 232a and that the controlling process returns to the procedure (a). In this embodiment, at this moment, the first object such as a board eraser or a palm is regarded by the sensing system 200 as a pointer because the length of time to be successively acquired is not long enough. For example, at this moment, the user may make a board eraser or a palm approach the area 212 by mistake and immediately remove the board eraser or the palm away from the area 212, and the sensing system 200 is prevented from starting the specific function because of misjudgment.

It should be noted that a first controlling period is composed of the abovementioned procedures (a)-(b)-(b1)-(c)-(d) and (d1). During the first controlling period, each of things capable of being sensed by the first image sensor 220 and the second image sensor 230 is named as the first object. That is, during the first controlling period, the first object is a common name of each of the things capable of being sensed by the first image sensor 220 and the second image sensor 230.

In the controlling method applied to the sensing system, whether the specific function is started is determined according to the size of the first total pattern P1 acquired. Accordingly, it is more convenient for a user to use the sensing system 200 having the abovementioned controlling method. In addition, in the controlling method applied to the sensing system, the abovementioned step may be the step of determining whether the specific function is started according to the size of the first total pattern P1 acquired and the length of time to successively acquire the first total pattern P1. Therefore, the possibility that the sensing system starts the specific function because of misjudgment can be reduced.

Figure 5:
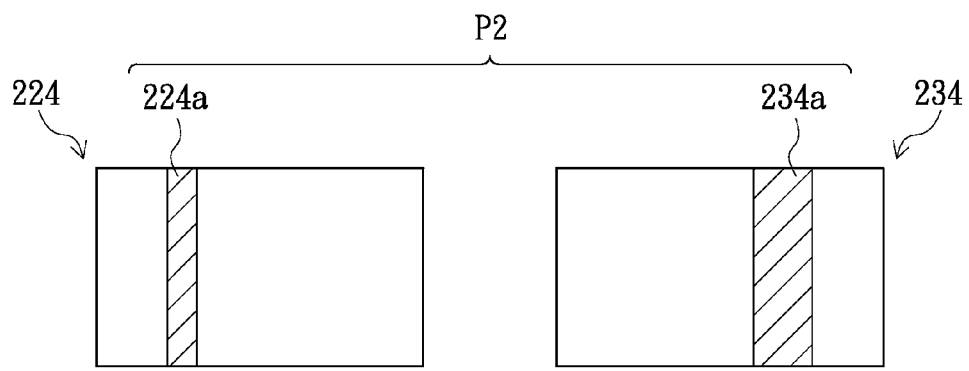
FIG. 5 is a schematic view of a third image and a fourth image sensed by the first image sensor and the second image sensor of the sensing system of FIG. 1.

FIG. 5 is a schematic view of a third image and a fourth image sensed by the first image sensor and the second image sensor of the sensing system of FIG. 1. In this embodiment, after the procedure (d) is executed, the controlling method applied to the sensing system further includes the following procedures. Referring to FIGS. 1, 2, 3 and 5, procedure (e) is executed. The procedure (e) includes that the first image sensor 220 and the second image sensor 230 simultaneously sense the area 212 for respectively acquiring the third image 224 and the fourth image 234. The third image 224 includes a third sub-pattern 224a, and the fourth image 234 includes a fourth sub-pattern 234a. A second total pattern P2 is composed of the third sub-pattern 224a and the fourth sub-pattern 234a. It should be noted that the third image 224 and the fourth image 234 correspond at that time to a second object adjacent to the area 212. That is, at this moment, the second object is adjacent to the area 212 of the panel 210 and sensed by the first image sensor 220 and the second image sensor 230 to be acquired as the third sub-pattern 224a of the third image sensor 224 and the fourth sub-pattern 234a of the fourth image sensor 234.

The second object may be a stylus, a finger, a board eraser or a palm. It should be noted that the second object corresponding to the third sub-patter 224a and the fourth sub-pattern 234a of FIG. 5 is, for example, a stylus.

Next, a procedure (f) is executed. The procedure (f) includes that whether the size of the second total pattern P2 is smaller than the first predetermined value is determined. The size of the second total pattern P2 is, for example, the sum total of the amount of the corresponding first sensing pixels which acquire the third sub-pattern 224a and the amount of the corresponding second sensing pixels which acquire the fourth sub-pattern 234a.

Next, a procedure (g) is executed. The procedure (g) includes that if the size of the second total pattern P2 is smaller than the first predetermined value, whether the length of time to successively acquire the second total pattern P2 is greater than or equal to the second predetermined value is further determined. It should be noted that the procedure (g) of FIG. 2B may be accomplished by means of the counting manner of FIG. 3B. For example, whenever the first image sensor 220 and the second image sensor 230 sense the area 212, the processor 240 determines whether the size of the second total pattern P2 is smaller than the first predetermined value. If the determination result is positive, the counting value is increased by one and the processor 240 further determines whether the counting value is greater than or equal to the third predetermined value, as shown in sub-procedures (g2) and (g3) of FIG. 3.

Next, a procedure (h) is executed. The procedure (h) includes that if the length of time to successively acquire the second total pattern P2 is greater than or equal to the second predetermined value, that is, if the counting value is greater than or equal to the third predetermined value, the processor 240 ends the specific function, calculates and outputs a second coordinate of the second object which corresponds at that time to the third sub-pattern 224a and the fourth sub-pattern 234a. In this embodiment, at this moment, the second object such as a stylus or a finger is regarded by the sensing system 200 as a pointer.

In addition, after the procedure (f) is executed, the controlling method applied to the sensing system further includes executing procedure (g1). The procedure (g1) includes that if the size of the second total pattern P2 is greater than or equal to the first predetermined value, the processor 240 successively starts the specific function, calculates and outputs the second coordinate of the second object which corresponds at that time to the third sub-pattern 224a and the fourth sub-pattern 234a and that the controlling process returns to the procedure (e). In this embodiment, at this moment, the second object such as a board eraser or a palm is regarded by the sensing system 200 as an erasing instrument.

In addition, after the procedure (g) is executed, the controlling method applied to the sensing system further includes executing procedure (h1). The procedure (h1) includes that if the length of time to successively acquire the first total pattern P2 is smaller than the second predetermined value, that is, if the counting value is smaller the third predetermined value, the processor 240 successively starts the specific function, calculates and outputs the second coordinate of the second object which corresponds at that time to the third sub-pattern 224a and the fourth sub-pattern 234a and that the controlling process returns to the procedure (e). In this embodiment, at this moment, the second object is such as a stylus is regarded by the sensing system 200 as an erasing instrument because the length of time to be successively acquired is not long enough. For example, at this moment, the user may make a stylus or a finger approach the area 212 by mistake and immediately remove the stylus or the finger away from the area 212, and the sensing system 200 is prevented from ending the specific function because of misjudgment.

It should be noted that the abovementioned a second controlling period is composed of procedures (e)-(f)-(g1)-(g)-(h) and (h1). During the second controlling period, each of things capable of being sensed by the first image sensor 220 and the second image sensor 230 is named as the second object. That is, during the second controlling period, the second object is a common name of each of the things capable of being sensed by the first image sensor 220 and the second image sensor 230.

It should be noted that in practice, before the procedure (a) of the first controlling period of the controlling method applied to the sensing system 200 is executed, the user may use stylus such another specific function (regarded as the second specific function) of the sensing system 200 is performed. The second specific function is, for example, the handwriting function or the drawing function. Next, after the specific function such as the erasing function (regarded as the first specific function which is different from the second specific function) is started for a period of time (e.g. the user uses a board eraser) and then is ended (e.g., the user removes the board eraser and picks up the stylus), the second specific function is started again. That is, the second specific function is a predetermined function of the sensing system 200.

Second Embodiment

Figure 6:
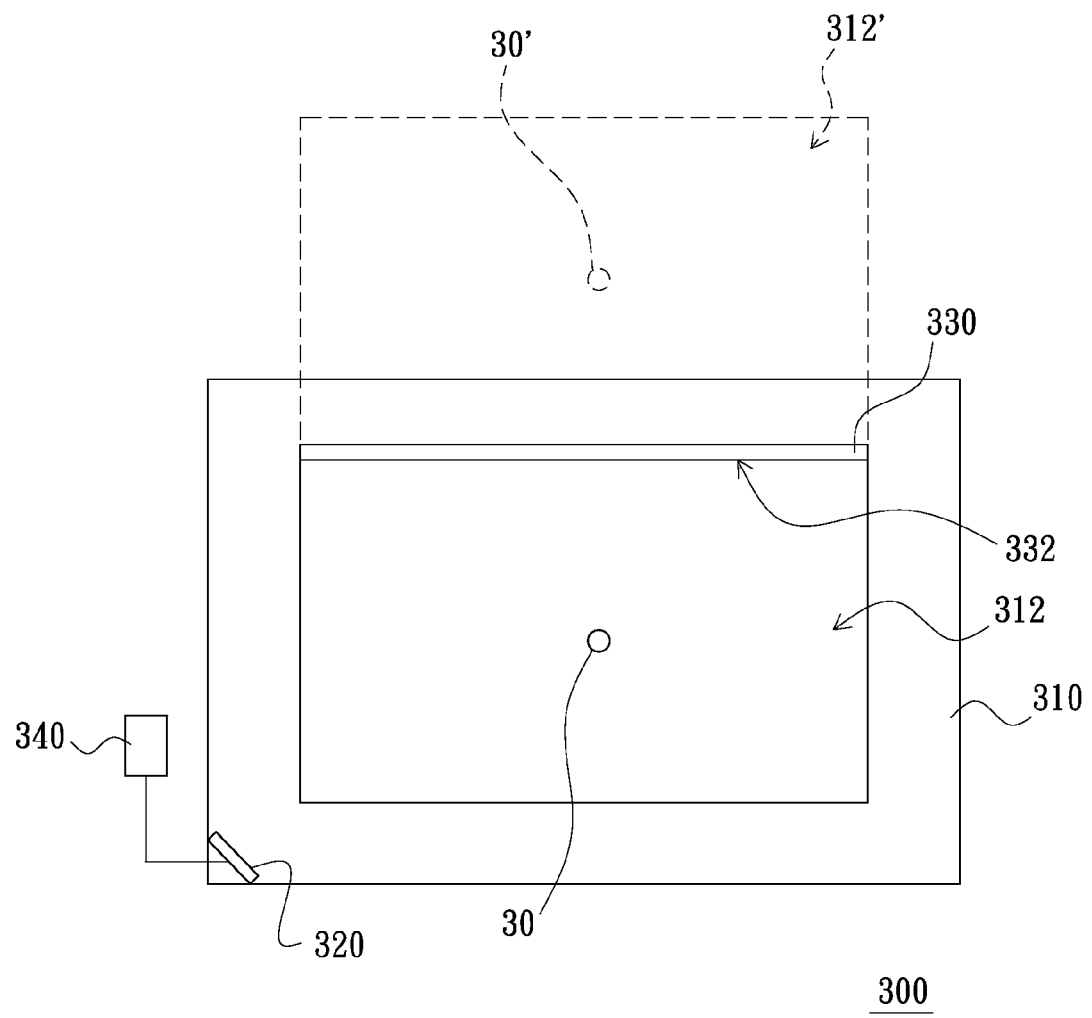
FIG. 6 is a schematic view of a sensing system according to a second embodiment of the present invention.

FIG. 6 is a schematic view of a sensing system according to a second embodiment of the present invention. The sensing system 300 includes a panel 310, an image sensor 320, a reflective mirror element 330 and a processor 340. The image sensor 320 is disposed at the panel 310. The reflective mirror element 330 is disposed at the panel 310 and a reflective mirror plane 332 of the reflective mirror element 330 mirrors a first area 312 of the panel 312 for forming a second area 312'. The image sensor 320 faces the reflective mirror element 330 and is electrically connected to the processor 340. A sensing range of the image sensor 320 covers the first area 312 and the second area 312'. That is, the second image sensor 230 of the first embodiment is omitted in the sensing system 300 of this embodiment and the reflective mirror element 330 is added in the sensing system 300 of this embodiment.

When a user uses an object 30 which is capable of being sensed by the sensing system 300 such that the object 20 approaches to the area 312, the object 30 is mirrored by the reflective mirror element 330 to form a mirror image 30'. The image sensor 320 senses the first area 312 and the second area 312' and the processor 340 calculates a position of the object 30 according to images sensed by the image sensor 320. The abovementioned technologies can be referred to Taiwan patent application no. 097126033, Taiwan patent application no. 097142355 and Taiwan patent application no. 098100969 and U.S. patent application Ser. No. 12/249,222, U.S. patent application Ser. No. 12/334,449 and U.S. patent application Ser. No. 12/422,191, which respectively correspond to the abovementioned Taiwan patent applications, and should not be described in detail herein.

Figure 7A:
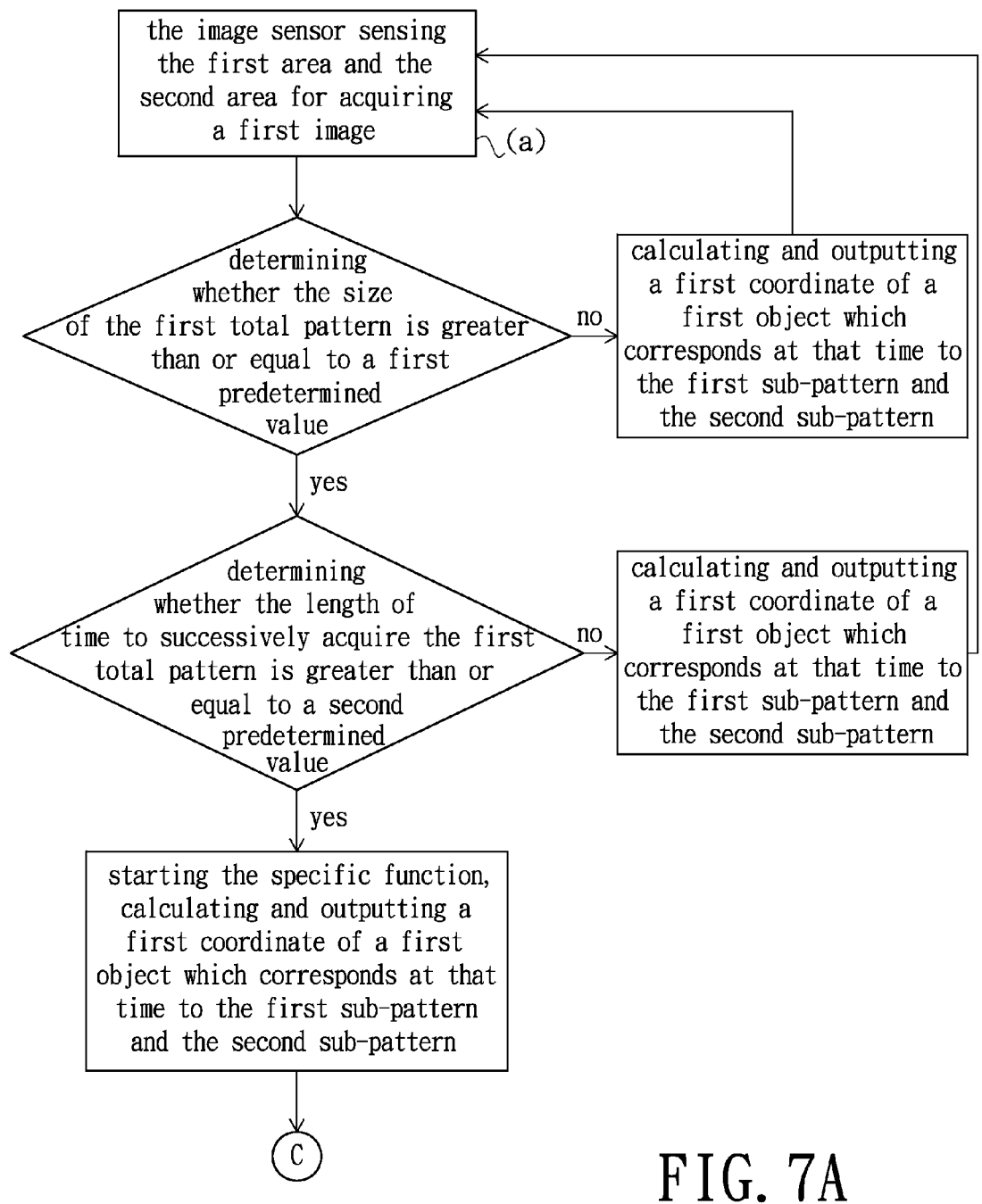
FIG. 7A to FIG. 7B are a flow chart of a controlling method applied to the sensing system of FIG. 6 according to the second embodiment of the present invention.
Figure 7B:
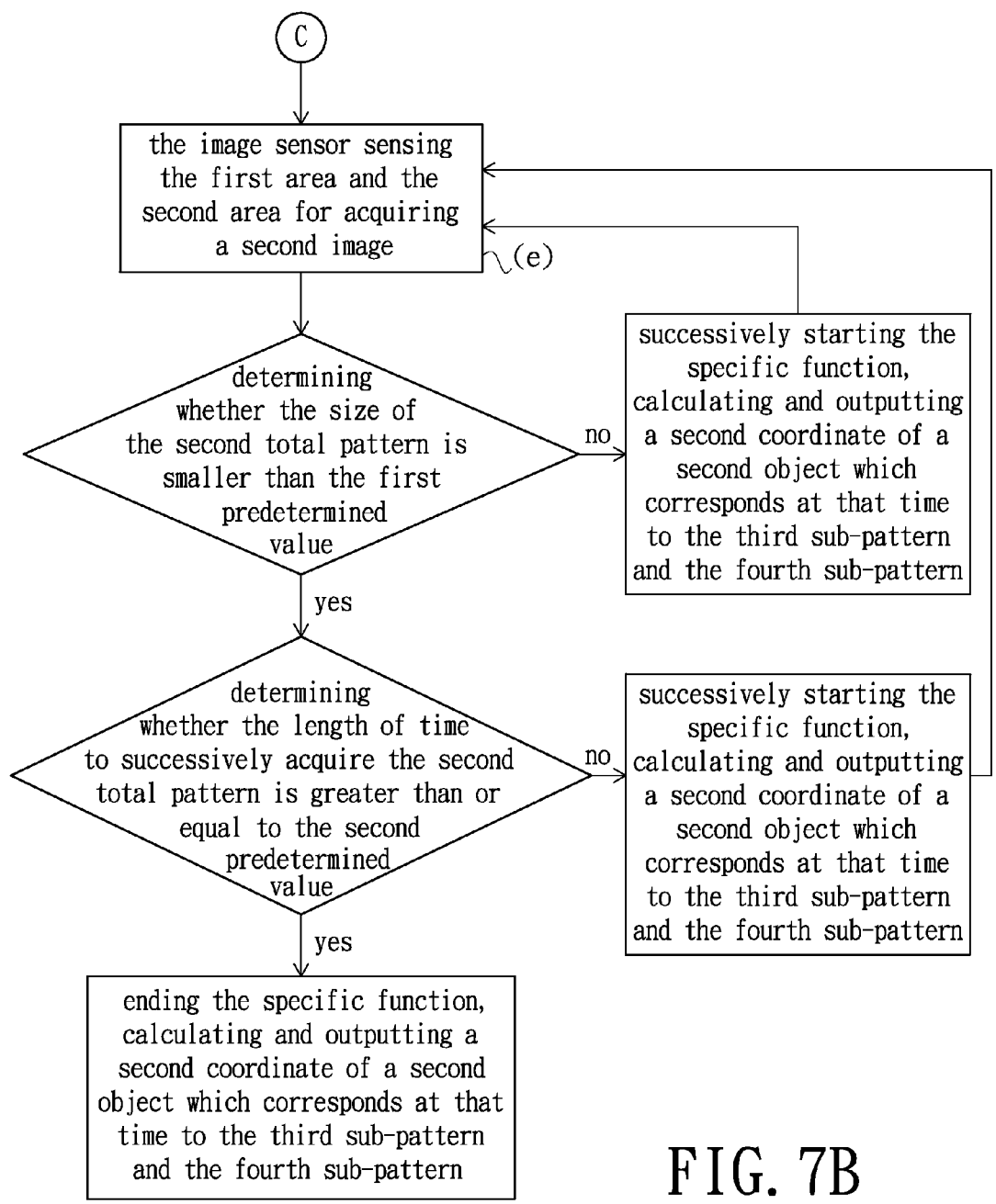
Figure 8A:
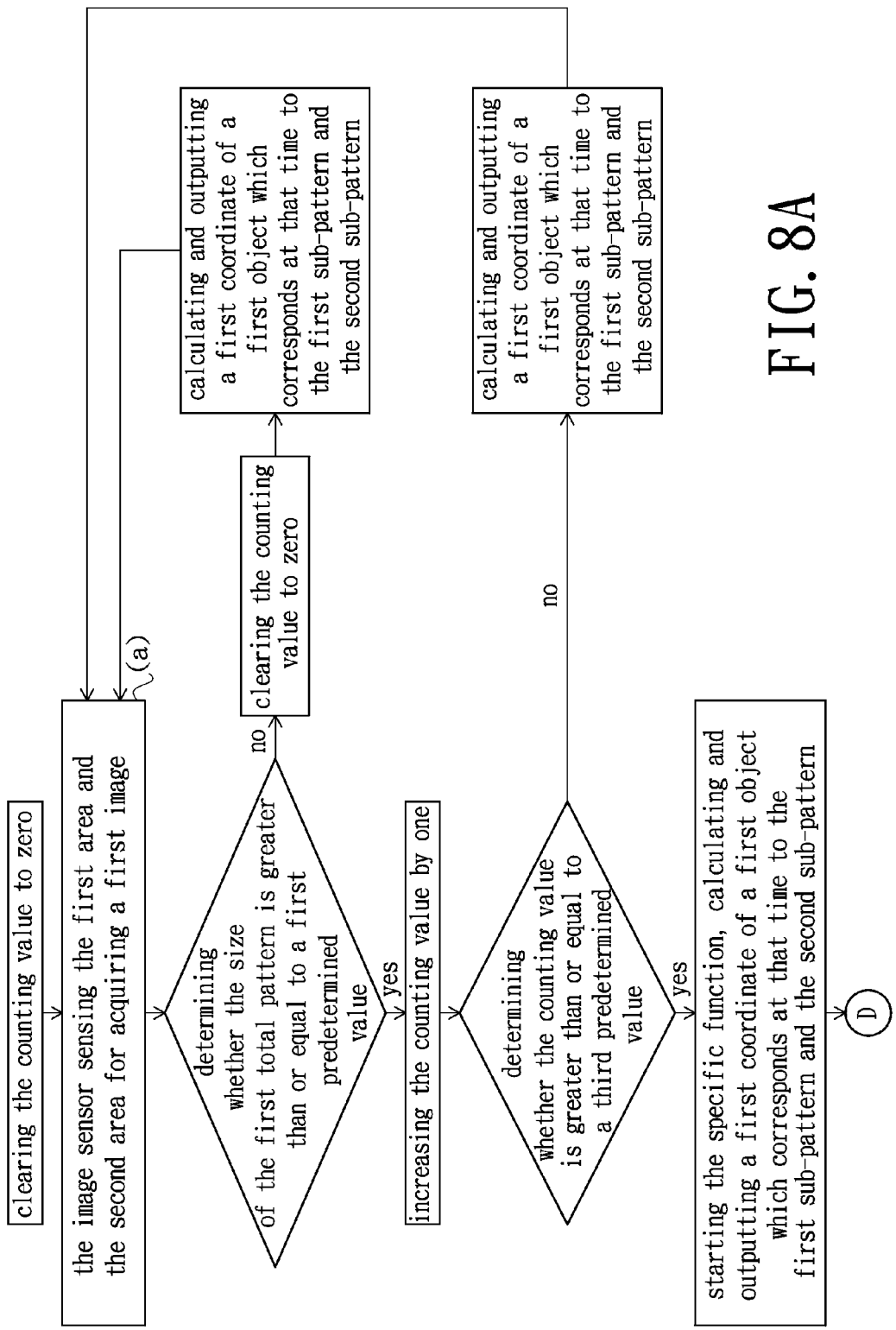
FIG. 8A to FIG. 8B are a detailed flow chart of the controlling method of FIGS. 7A and 7B.
Figure 8B:
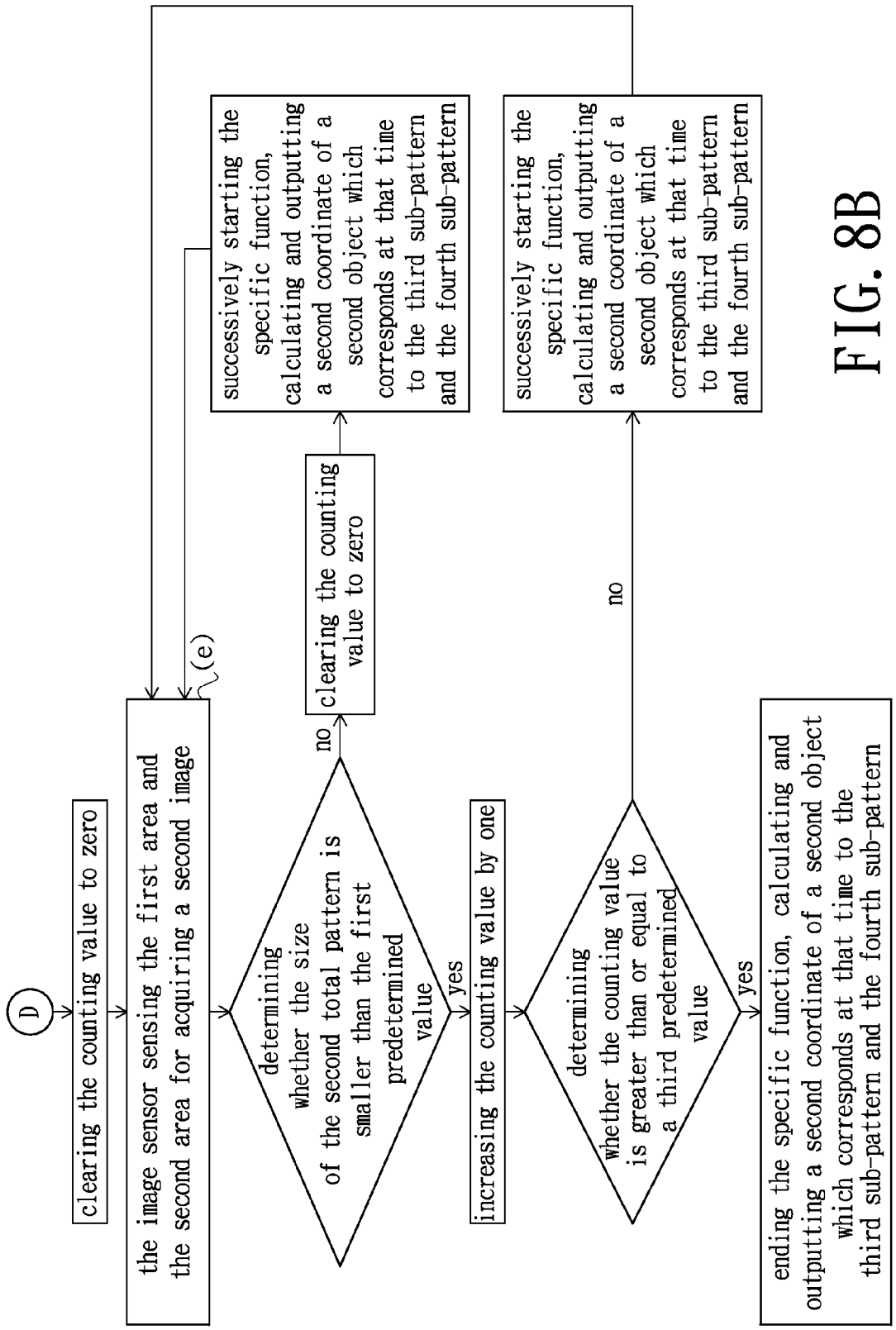
Figure 9:
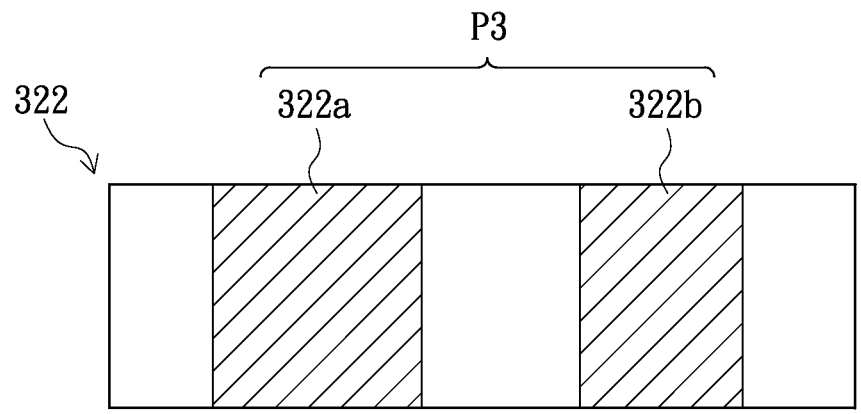
FIG. 9 is a schematic view of a first image sensed by the image sensor of the sensing system of FIG. 6.
Figure 10:
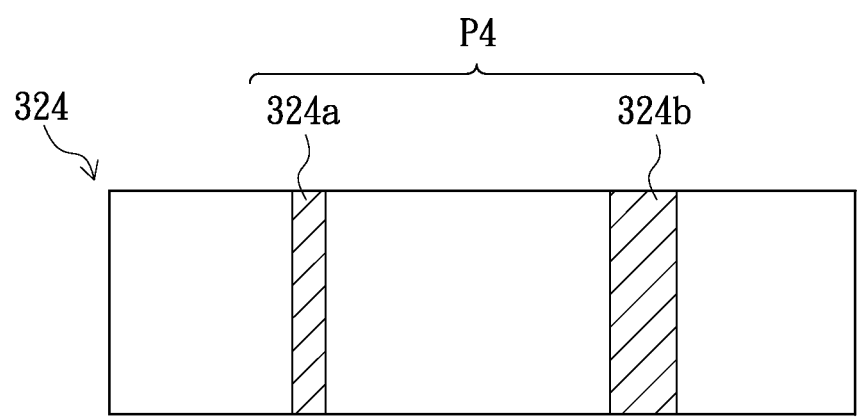
FIG. 10 is a schematic view of a second image sensed by the image sensor of the sensing system of FIG. 6.

FIG. 7A to FIG. 7B are a flow chart of a controlling method applied to the sensing system of FIG. 6 according to the second embodiment of the present invention. FIG. 8A to FIG. 8B are a detailed flow chart of the controlling method of FIGS. 7A and 7B. FIG. 9 is a schematic view of a first image sensed by the image sensor of the sensing system of FIG. 6. FIG. 10 is a schematic view of a second image sensed by the image sensor of the sensing system of FIG. 6. Referring to FIGS. 6 to 10, the difference between the controlling method applied to the sensing system of this embodiment and the controlling method applied to the sensing system of the first embodiment is that the procedures (a) and (e) of this embodiment are different from the procedures (a) and (e) of the first embodiment.

In the procedure (a) of this embodiment, the image sensor 320 senses the first area 312 and the second area 312' for acquiring a first image 322. The first image 322 includes a first sub-pattern 322a and a second sub-pattern 322b, and a first total pattern P3 is composed of the first sub-pattern 322a and the second sub-pattern 322b.

In this embodiment, the first image sensor 320 has a plurality of sensing pixels (not shown) suitable for sensing the first area 312 and the second area 312'. When a first object (not shown) approaches the first area 312 of the panel 310, the sensing pixels of the image sensor 320 sense the first area 312 and the second area 312', and the sensing pixels of the image sensor 320 acquire the first image 322. Meanwhile, at least a part of the sensing pixels sense the first object to acquire the first sub-pattern 322a, and at least a part of the sensing pixels sense the mirror image of the first object to acquire the second sub-pattern 322b. That is, at this moment, the first object is adjacent to the first area 312 of the panel 310, and the first object and its mirror image are sensed by the image sensor 320 to be acquired as the first sub-pattern 322a and the second sub-pattern 322b of the first image 322.

The size of the first total pattern P3 is, for example, the sum total of the amount of the corresponding sensing pixels which acquire the first sub-pattern 322a and the amount of the corresponding sensing pixels which acquire the second sub-pattern 322b. It should be noted that the first object corresponding to the first sub-pattern 322a of FIG. 9 is, for example, a board eraser.

In the procedure (e) of this embodiment, the image sensor 320 senses the first area 312 and the second area 312' for acquiring a second image 324. The first image 324 includes a third sub-pattern 324a and a fourth sub-pattern 324b, and a second total pattern P4 is composed of the third sub-pattern 324a and the fourth sub-pattern 324b. The third sub-pattern 324a and the fourth sub-pattern 324b correspond at that time to a second object adjacent to the first area 312 and a mirror image of the second object, respectively. That is, at this moment, the second object is adjacent to the first area 312 of the panel 310, and the second object and its mirror image are sensed by the image sensor 320 to be acquired as the third sub-pattern 324a and the fourth sub-pattern 324b of the second image 324.

The size of the second total pattern P4 is, for example, the sum total of the amount of the corresponding sensing pixels which acquire the third sub-pattern 324a and the amount of the corresponding sensing pixels which acquire the fourth sub-pattern 324b. It should be noted that the second object corresponding to the third sub-patter 324a of FIG. 10 is, for example, a stylus.

In addition, the first predetermined value of this embodiment may be a predetermined amount of pixels which may be between ½ of the amount of the sensing pixels of the image sensor 320 and ⅔ of the amount of the sensing pixels of the image sensor 320.

According to the mentioned above, the controlling method applied to the sensing system of the embodiment of the present invention has at least one of the following or other advantages:

1. In the controlling method applied to the sensing system, whether the specific function is started is determined according to the size of the first total pattern acquired. Accordingly, it is more convenient for a user to use the sensing system having the abovementioned controlling method.

2. In the controlling method applied to the sensing system, the abovementioned step is the step of determining whether the specific function is started according to the size of the first total pattern acquired and the length of time to successively acquire the first total pattern. Therefore, the possibility that the sensing system starts the specific function because of misjudgment can be reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A controlling method applied to a sensing system, the sensing system comprising a panel, a first image sensor and a second image sensor; the first image sensor and the second image sensor being disposed at the panel, a sensing range of the first image sensor and a sensing range of the second image sensor respectively covering an area of the panel where the first object located in, the controlling method comprising:

(a) the first image sensor and the second image sensor simultaneously sensing the area for respectively acquiring a first image and a second image, wherein the first image comprises a first sub-pattern, the second image comprises a second sub-pattern, the first sub-pattern and the second sub-pattern correspond at that time to the first object, and the first total pattern is composed of the first sub-pattern and the second sub-pattern;

(b) determining whether the amount of pixels of the first total pattern is greater than or equal to a first predetermined value;

(c) further determining whether the length of time to successively acquire the first total pattern is greater than or equal to a second predetermined value if the amount of pixels of the first total pattern is greater than or equal to the first predetermined value;

(d) starting the specific function if the length of time to successively acquire the first total pattern is greater than or equal to the second predetermined value;

(e) the first image sensor and the second image sensor simultaneously sensing the area where the first object and a second object located in for respectively acquiring a third image and a fourth image, wherein the third image comprises a third sub-pattern, the fourth image comprises a fourth sub-pattern, the third sub-pattern and the fourth sub-pattern correspond at that time to the second object, and a second total pattern is composed of the third sub-pattern and the fourth sub-pattern;

(f) determining whether the amount of pixels of the second total pattern is smaller than the first predetermined value;

(g) further determining whether the length of time to successively acquire the second total pattern is greater than or equal to the second predetermined value if the amount of pixels of the second total pattern is smaller than the first predetermined value; and (h) ending the specific function if the length of time to successively acquire the second total pattern is greater than or equal to the second predetermined value.

2. The controlling method applied to a sensing system as claimed in claim 1, further comprising:
 (g1) successively starting the specific function and returning to the procedure (e) if the amount of pixels of the second total pattern is greater than or equal to the first predetermined value.

3. The controlling method applied to a sensing system as claimed in claim 2, wherein the procedure (g1) further comprises calculating and outputting a second coordinate of the second object.

4. The controlling method applied to a sensing system as claimed in claim 1, wherein the procedure (h) further comprises calculating and outputting a second coordinate of the second object.

5. The controlling method applied to a sensing system as claimed in claim 1, further comprising:
 (h1) successively starting the specific function and returning to the procedure (e) if the length of time to successively acquire the second total pattern is smaller than the second predetermined value.

6. The controlling method applied to a sensing system as claimed in claim 5, wherein the procedure (h1) further comprises calculating and outputting a second coordinate of the second object.

7. The controlling method applied to a sensing system as claimed in claim 1, wherein the first image sensor has a plurality of first sensing pixels suitable for sensing the area, the second image sensor has a plurality of second sensing pixels suitable for sensing the area, and the amount of pixels of the second total pattern is the sum total of the amount of the corresponding first sensing pixels which acquire the third sub-pattern and the amount of the corresponding second sensing pixels which acquire the fourth sub-pattern.

8. The controlling method applied to a sensing system as claimed in claim 1, wherein the first image sensor has a plurality of first sensing pixels suitable for sensing the area, the second image sensor has a plurality of second sensing pixels suitable for sensing the area, and the amount of pixels of the first total pattern is the sum total of the amount of the corresponding first sensing pixels which acquire the first sub-pattern and the amount of the corresponding second sensing pixels which acquire the second sub-pattern.

9. A controlling method applied to a sensing system, the sensing system comprising a panel, an image sensor, and a reflective mirror element; the image sensor being disposed at the panel, the reflective mirror element being disposed at the panel and mirrors a first area of the panel for forming a second area, a sensing range of the image sensor covering the first area and the second area, the controlling method comprising:
 (a) the image sensor sensing the first area and the second area for acquiring a first image, wherein the first image comprises a first sub-pattern and a second sub-pattern, the first sub-pattern and the second sub-pattern correspond at that time to the first object, and the first total pattern is composed of the first sub-pattern and the second sub-pattern;
 (b) determining whether the amount of pixels of the first total pattern is greater than or equal to a first predetermined value;
 (c) further determining whether the length of time to successively acquire the first total pattern is greater than or equal to a second predetermined value if the amount of pixels of the first total pattern is greater than or equal to the first predetermined value;
 (d) starting the specific function if the length of time to successively acquire the first total pattern is greater than or equal to the second predetermined value;
 (e) the image sensor sensing the first area and the second area where the first object and a second object located in for acquiring a second image, wherein the second image comprises a third sub-pattern and a fourth sub-pattern, the third sub-pattern and the fourth sub-pattern correspond at that time to the second object, and a second total pattern is composed of the third sub-pattern and the fourth sub-pattern;
 (f) determining whether the amount of pixels of the second total pattern is smaller than the first predetermined value;
 (g) further determining whether the length of time to successively acquire the second total pattern is greater than or equal to the second predetermined value if the amount of pixels of the second total pattern is smaller than the first predetermined value; and
 (h) ending the specific function if the length of time to successively acquire the second total pattern is greater than or equal to the second predetermined value.

10. The controlling method applied to a sensing system as claimed in claim 9, further comprising:
 (g1) successively starting the specific function and returning to the procedure (e) if the amount of pixels of the second total pattern is greater than or equal to the first predetermined value.

11. The controlling method applied to a sensing system as claimed in claim 10, wherein the procedure (g1) further comprises calculating and outputting a second coordinate of the second object.

12. The controlling method applied to a sensing system as claimed in claim 9, wherein the procedure (h) further comprises calculating and outputting a second coordinate of the second object.

13. The controlling method applied to a sensing system as claimed in claim 9, further comprising:
 (h1) successively starting the specific function and returning to the procedure (e) if the length of time to successively acquire the second total pattern is smaller than the second predetermined value.

14. The controlling method applied to a sensing system as claimed in claim 13, wherein the procedure (h1) further comprises calculating and outputting a second coordinate of the second object.

15. The controlling method applied to a sensing system as claimed in claim 9, wherein the image sensor has a plurality of sensing pixels suitable for sensing the first area and the second area, and the amount of pixels of the second total pattern is the sum total of the amount of the corresponding sensing pixels which acquire the third sub-pattern and the amount of the corresponding sensing pixels which acquire the fourth sub-pattern.

16. The controlling method applied to a sensing system as claimed in claim 9, wherein the image sensor has a plurality of sensing pixels suitable for sensing the first area and the second area, and the amount of pixels of the first total pattern is the sum total of the amount of the corresponding sensing pixels which acquire the first sub-pattern and the amount of the corresponding sensing pixels which acquire the second sub-pattern.

17. The controlling method applied to a sensing system as claimed in claim 9, wherein the specific function is an erasing function.

18. The controlling method applied to a sensing system as claimed in claim 1, wherein the specific function is an erasing function.

* * * * *